(12) United States Patent
Heng et al.

(10) Patent No.: US 12,115,697 B2
(45) Date of Patent: *Oct. 15, 2024

(54) APPARATUS FOR EXTRUDING CERAMIC SLURRY

(71) Applicant: THE BOEING COMPANY, Chicago, IL (US)

(72) Inventors: Vann Heng, Buena Park, CA (US); Stephen Lehman, Golden Eagle, IL (US); Randall Schubert, Santa Monica, CA (US)

(73) Assignee: The Boeing Company, Chicago, IL (US)

( * ) Notice: Subject to any disclaimer, the term of this patent is extended or adjusted under 35 U.S.C. 154(b) by 434 days.

This patent is subject to a terminal disclaimer.

(21) Appl. No.: 17/462,877

(22) Filed: Aug. 31, 2021

(65) Prior Publication Data

US 2021/0394392 A1 Dec. 23, 2021

Related U.S. Application Data

(62) Division of application No. 15/417,332, filed on Jan. 27, 2017, now Pat. No. 11,123,895.

(51) Int. Cl.
*B28B 3/20* (2006.01)
*B01F 23/53* (2022.01)
(Continued)

(52) U.S. Cl.
CPC ............... *B28B 3/20* (2013.01); *B01F 23/53* (2022.01); *B01F 35/7543* (2022.01);
(Continued)

(58) Field of Classification Search
CPC ... B29C 64/209; B29C 64/241; B29C 64/307; B29C 64/314; B29C 64/321;
(Continued)

(56) References Cited

U.S. PATENT DOCUMENTS 3,191,229 A 6/1965 Vanzo
5,035,593 A * 7/1991 Huang ................ B28B 13/0275
425/197

(Continued)

FOREIGN PATENT DOCUMENTS

CN 202640527 U 1/2013
CN 205553135 U 9/2016
(Continued)

OTHER PUBLICATIONS

Notice of Reasons for Rejection for JP Application No. 2017-197472 dated Nov. 8, 2021.
(Continued)

*Primary Examiner* — Seyed Masoud Malekzadeh
(74) *Attorney, Agent, or Firm* — Quinn IP Law (57) ABSTRACT

An extruder includes a receptacle for containing material to be extruded. The extruder further includes a dispersion blade positioned within the receptacle and a nozzle secured to the receptacle. The nozzle defines a first opening positioned within an interior of the receptacle, defines a second opening positioned outside of the receptacle and defines a channel which extends from the first opening through the nozzle to the second opening defining a flow path which extends from the first opening, through the channel and to the second opening. The nozzle extends through a wall of the receptacle and into the interior of the receptacle such that the first opening is positioned spaced apart from the wall.

20 Claims, 5 Drawing Sheets

(51) Int. Cl.
- *B01F 35/75* (2022.01)
- *B28B 1/00* (2006.01)
- *B28B 13/02* (2006.01)
- *B28C 5/00* (2006.01)
- *B28C 5/08* (2006.01)
- *B28C 5/48* (2006.01)
- *B29C 64/106* (2017.01)
- *B29C 64/209* (2017.01)
- *B01F 23/00* (2022.01)

(52) U.S. Cl.
CPC ............ *B28B 1/001* (2013.01); *B28B 13/021* (2013.01); *B28C 5/006* (2013.01); *B28C 5/0806* (2013.01); *B28C 5/48* (2013.01); *B29C 64/106* (2017.08); *B29C 64/209* (2017.08); *B01F 23/023* (2022.01)

(58) Field of Classification Search
CPC ........... B28B 1/001; B28B 3/20; B28C 5/006; B28C 5/48; B28C 5/08
See application file for complete search history.

(56) References Cited

U.S. PATENT DOCUMENTS

| | | | |
|---|---|---|---|
| 10,071,350 B2 | 9/2018 | Lewis et al. | |
| 2005/0196482 A1* | 9/2005 | Khoshnevis | E04G 11/34 425/207 |
| 2006/0283987 A1* | 12/2006 | Anderson | B05C 5/0275 239/570 |
| 2016/0185040 A1 | 6/2016 | Costlow | |
| 2016/0200024 A1* | 7/2016 | Kim | B29C 48/832 425/375 |
| 2016/0263822 A1* | 9/2016 | Boyd, IV | B32B 27/00 |
| 2016/0303802 A1 | 10/2016 | Meshorer et al. | |
| 2017/0173692 A1 | 6/2017 | Myerberg et al. | |
| 2017/0217088 A1* | 8/2017 | Boyd, IV | B29C 64/106 |
| 2018/0154573 A1* | 6/2018 | Miles | B33Y 10/00 |
| 2019/0217538 A1* | 7/2019 | Katon | B33Y 10/00 |

FOREIGN PATENT DOCUMENTS

| | | |
|---|---|---|
| CN | 205735414 U | 11/2016 |
| EP | 3081364 A1 | 10/2016 |
| GB | 2538522 A | 11/2016 |
| JP | 2010-47022 A | 3/2010 |
| RU | 2543195 C1 | 2/2015 |
| WO | WO-2016164562 A1 | 10/2016 |

OTHER PUBLICATIONS

Communication Pursuant to Article 94(3) EPC for EP Application No. 17203707.9 dated Oct. 20, 2021.
Mason et al., Freeform Extrusion of High Solids Loading Ceramic Slurries, Part I: Extrusion Process Modeling dated Sep. 14, 2006.
EPO Extended Search Report for Application No. 17203707.9 dated Jul. 20, 2018.
First Office Action for CN Application No. 2017113307346 dated Aug. 21, 2020.
Office Action for RU Application No. 2017135755 dated Jan. 29, 2021.
Communication Pursuant to Article 94(3) EPC for EP Application No. 17203707.9 dated Mar. 25, 2021.
Non-Final Office Action for U.S. Appl. No. 15/417,332 dated May 16, 2019.
Final Office Action for U.S. Appl. No. 15/417,332 dated Nov. 18, 2019.
Non-Final Office Action for U.S. Appl. No. 15/417,332 dated Jun. 12, 2020.
Final Office Action for U.S. Appl. No. 15/417,332 dated Dec. 15, 2020.
Notice of Allowance for U.S. Appl. No. 15/417,332 dated May 26, 2021.

\* cited by examiner

APPARATUS FOR EXTRUDING CERAMIC SLURRY

CROSS-REFERENCE TO RELATED APPLICATION

This application is a divisional of U.S. patent application Ser. No. 15/417,332, entitled "Apparatus for Extruding Ceramic Slurry" and filed Jan. 27, 2017, now U.S. Pat. No. 11,123,895 issued on Sep. 21, 2021, the entire disclosure of which is incorporated by reference herein.

FIELD

The present application relates to additive manufacturing, and is more particularly directed to an extruder for extruding a heterogeneous ceramic slurry.

BACKGROUND

A heterogeneous slurry, such as a ceramic slurry which contains particles or fibers of a higher density than the liquid portion of the mixture, are difficult to extrude in an additive manufacturing process. The higher density material tends to settle out of the slurry mixture over time. With the higher density material settling out, the slurry material extruded tends to lead to varying density of material being deposited. When the diameter of an extrusion nozzle is of the same order of magnitude as the fibers or particles characteristic length, the fibers or particles tend to clog the nozzle and prevent the slurry from extruding consistently or at all.

Previous attempts to resolve the problems associated with extruding a heterogeneous slurry of ceramic material included the use of higher pressure applied to the slurry to force the slurry through the nozzle. This approach however can result in inconsistent deposition and sputtering because you are expelling more liquid and leaving a higher concentration of solid fibers behind within the nozzle.

There is a need to have an extruder which will extrude heterogeneous mixtures of ceramic slurry which contain suspended higher density material. The extruder would need to inhibit clogging of the nozzle with the suspended material contained within the slurry mixture and would need to provide an even consistent flow of well mixed heterogeneous slurry material.

SUMMARY

An example includes an extruder which includes a receptacle for containing material to be extruded. The extruder further includes a dispersion blade positioned within the receptacle and a nozzle secured to the receptacle, wherein the nozzle defines a first opening positioned within an interior of the receptacle, defines a second opening positioned outside of the receptacle and defines a channel which extends from the first opening through the nozzle to the second opening defining a flow path which extends from the first opening, through the channel and to the second opening. The nozzle extends through a wall of the receptacle and into the interior of the receptacle such that the first opening is positioned spaced apart from the wall.

An example includes a method for extruding a heterogeneous slurry material from an extruder which includes the steps of mixing the heterogeneous slurry within an interior of a receptacle of the extruder and pressurizing the heterogeneous slurry positioned within the interior of the receptacle of the extruder. The method further includes the step of removing the heterogeneous slurry contained within the interior of the receptacle through a nozzle secured to the receptacle and in fluid communication with the heterogeneous slurry within the interior of the receptacle. The nozzle defines a first opening positioned within the interior of the receptacle, defines a second opening positioned outside of the receptacle and defines a channel which extends from the first opening through the nozzle to the second opening defining a flow path which extends through the nozzle from the first opening, through the channel and to the second opening. The nozzle extends through a wall of the receptacle and into the interior of the receptacle such that the first opening is positioned spaced apart from the wall.

The features, functions, and advantages that have been discussed can be achieved independently in various embodiments or may be combined in yet other embodiments further details of which can be seen with reference to the following description and drawings.

DESCRIPTION

As mentioned earlier, extruding a heterogeneous material such as ceramic slurry in additive manufacturing can be problematic based on the varying density of the material being extruded to be deposited. This can be the case, for example, in additive manufacturing of low density and high porosity ceramic parts. When additive manufacturing is employed to manufacture parts of low density and high porosity from ceramic slurry, the material needs to be extruded in the printing process from the extruder in a uniform, consistent and predictable manner. The ceramic slurry material is often in heterogeneous suspensions wherein the materials suspended include fibers or particles that have a higher density than the liquid within the slurry. As a result, complications arise with the higher density material settling out in the extruder and blocking the outflow through a nozzle of the ceramic slurry from the extruder, such that for example a disproportionate amount of liquid flows out of the extruder compared to the amount of suspension materials such as fibers or particles. This can result in inconsistent deposits of material in the printing fabrication process. In some instances, the suspension material within the ceramic slurry can completely block outflow of the ceramic slurry from the nozzle requiring the fabricator to stop the process and clean the nozzle.

Figure 1:
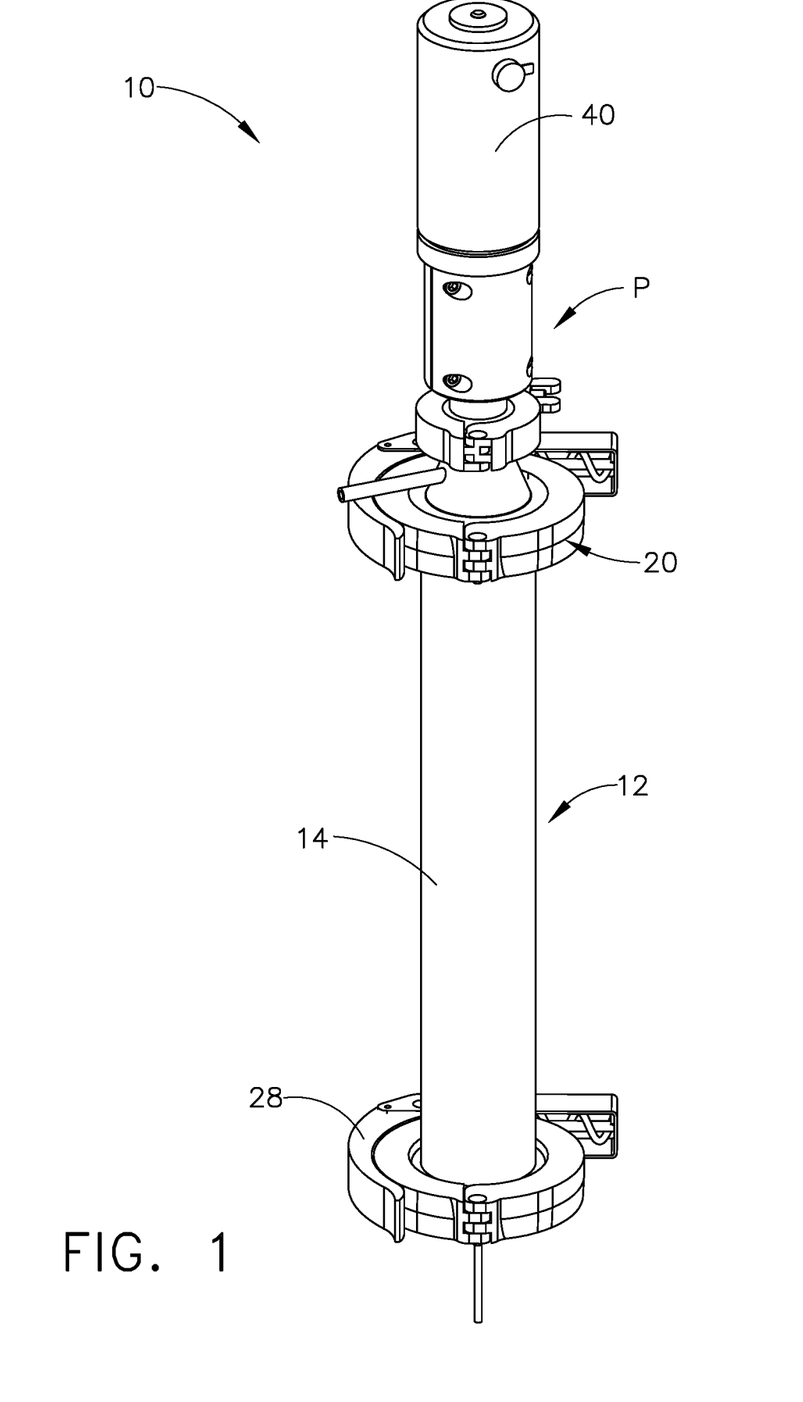
FIG. 1 is a perspective view of the extruder for extruding a heterogeneous ceramic slurry of the present disclosure.

In referring to FIG. 1, extruder 10 includes receptacle 12 for containing material to be extruded from receptacle extruder 10 such as, in this example, ceramic slurry. Ceramic slurry is a heterogeneous material in which an example includes an aqueous ceramic fiber slurry containing a body of ceramic fibers including about fifty (50) weight percent to about eighty (80) weight percent silica fibers and about twenty (20) weight percent to about fifty (50) weight percent alumina fibers. Also included is xanthan gum that has a weight between about 0.25 percent and about 2.5 percent of weight of the binder and the body of ceramic fibers before the aqueous ceramic fiber slurry is heated to provide the slurry with a viscosity that is suitable for extrusion through a nozzle to manufacture a low-density, high porosity ceramic part.

Figure 2:
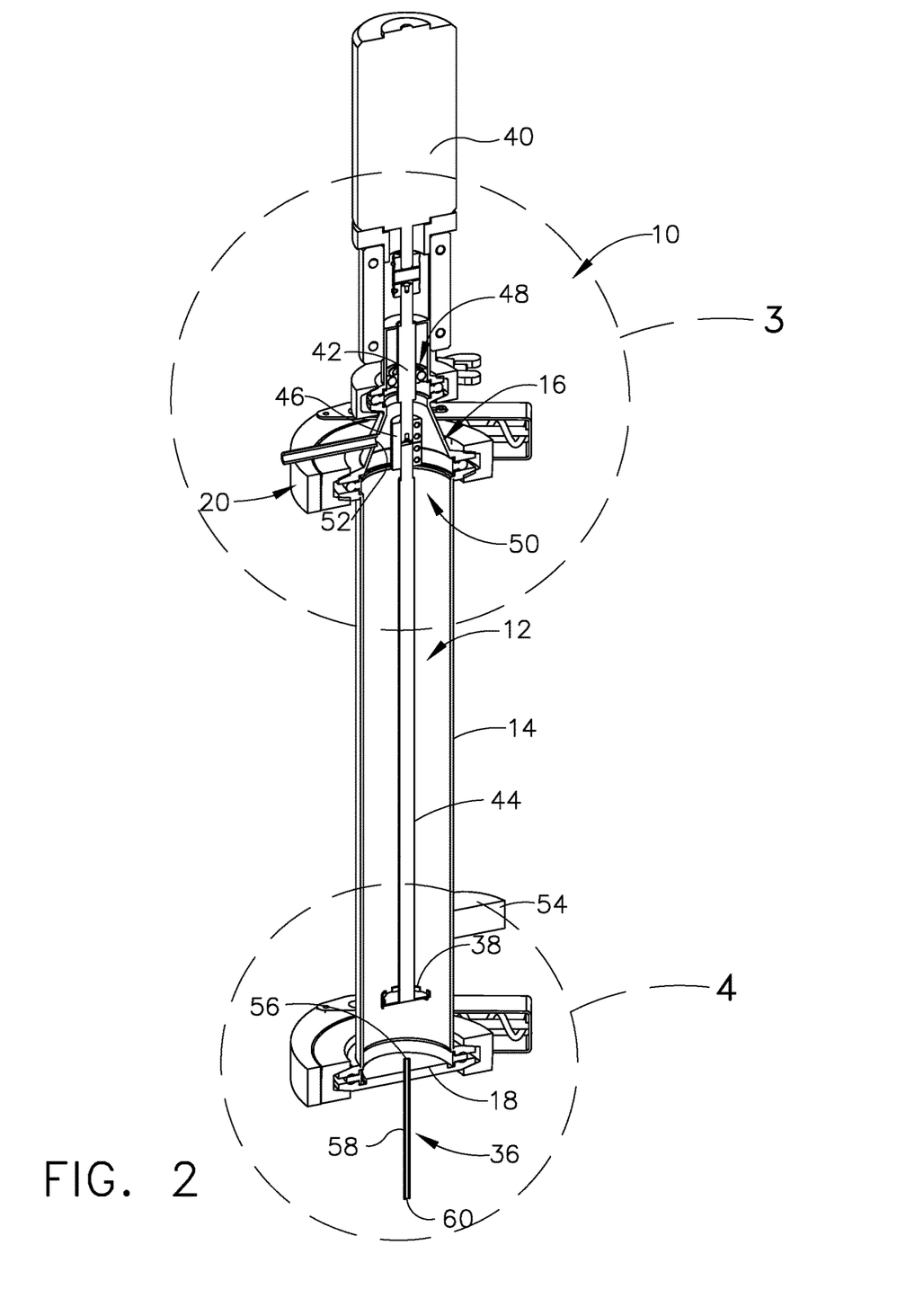
FIG. 2 is a cross section view of the extruder of FIG. 1.
Figure 3:
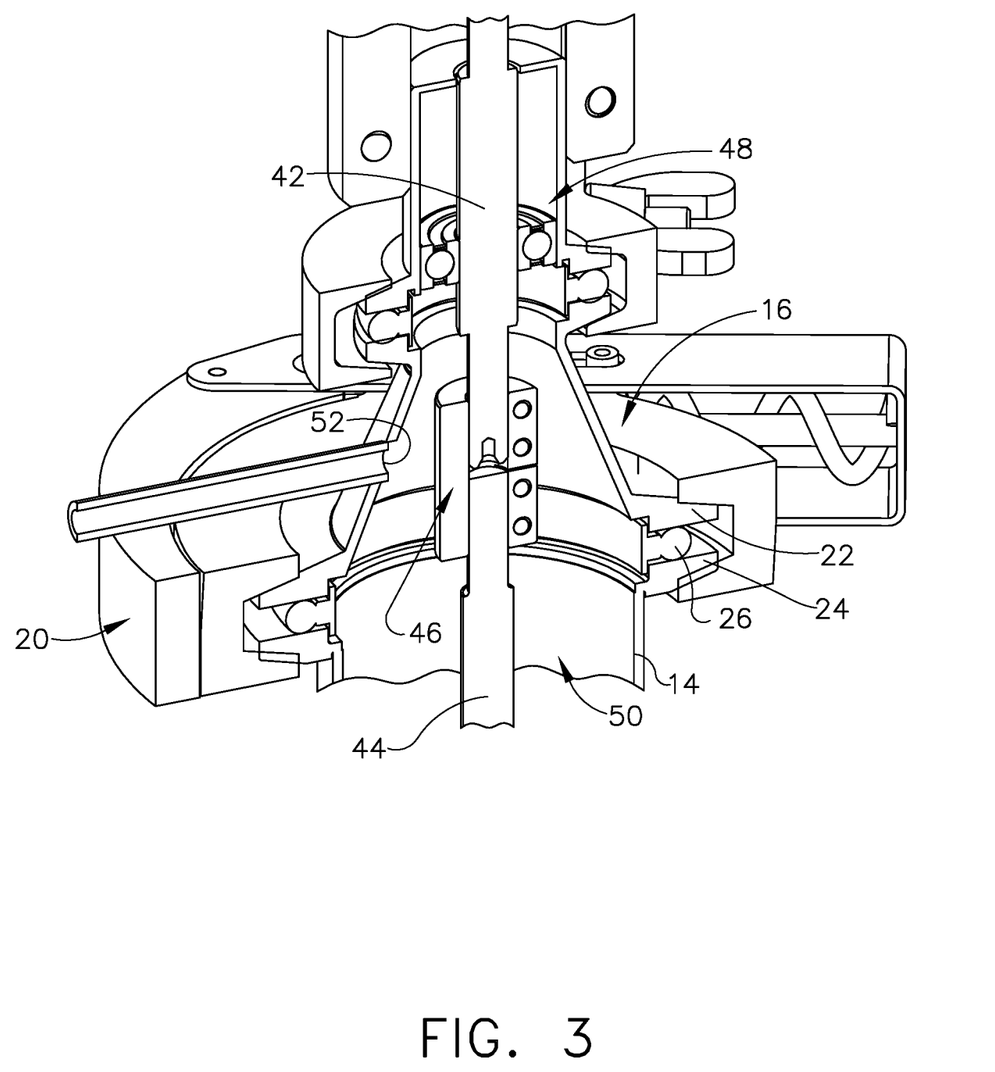
FIG. 3 is an enlarged view of the extruder of FIG. 2 as identified within the circle designated as 3 within FIG. 2.
Figure 4:
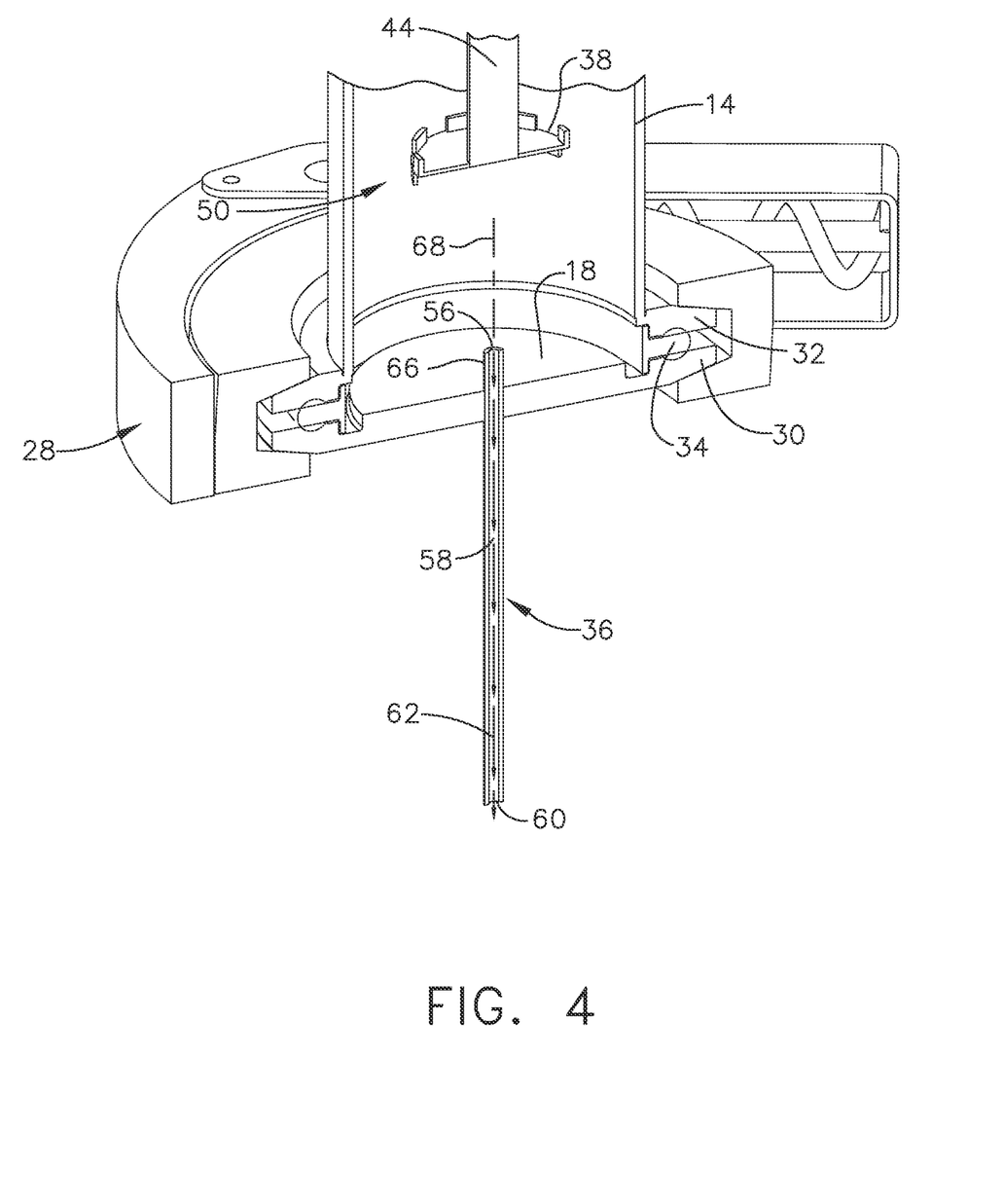
FIG. 4 is an enlarged view of the extruder of FIG. 2 as identified within the circle designated as 4 of FIG. 2.

Receptacle 12 can be an unitary structure or an assembly of components. As seen in FIG. 2, in this example, receptacle 12 is constructed of several assembled components which include chamber 14, top component 16 and bottom wall 18. As seen in FIG. 3, top component 16 is clamped to chamber 14 with first clamp 20. Flange 22 of top component 16 and first flange 24 of chamber 14 are secured together with first clamp 20 with first seal 26 positioned between flange 22 and first flange 24. Releasing first clamp 20 permits the user to remove top component 16 from chamber 14 such that chamber 14 can be filled with ceramic slurry and permitting top component 16 to be reconnected and sealed to chamber 14 for operation. Wall 18 of receptacle 12, as seen in FIGS. 2 and 4, is similarly clamped to chamber 14 with second clamp 28, wherein flange 30 of wall 18 and second flange 32 of chamber 14 are secured together with second clamp 28 with second seal 34 positioned between flange 30 and second flange 32. Releasing second clamp 28 permits the user to remove bottom wall 18 from chamber 14 allowing nozzle 36 secured to, in this example, bottom wall 18 of receptacle 12 of extruder 10, to be replaced when needed.

Receptacle 12 includes a dispersion blade 38, as seen in FIGS. 2 and 4, positioned within the receptacle 12, which, as will be discussed in more detail herein, is rotated within receptacle 12 mixing ceramic slurry and inhibiting suspension material such as fibers from settling out within receptacle 12. Mixing motor 40, as seen in FIGS. 1 and 2, includes rotatable drive shaft 42 which extends into receptacle 12 and which is coupled within interior 50 of chamber 14 to mixing shaft 44 with shaft clamp 46. Dispersion blade 38, as seen in FIGS. 2 and 4, is secured to mixing shaft 44 such that with activation of mixing motor 40 rotation is imparted to dispersion blade 38, in this example, at a rate of rotation in a range which includes one up to and including five hundred rotations per minute. Dispersion blade 38 is rotated mixing the higher density suspension material such as fibers within ceramic material without chopping the suspension material. The mixing maintains the higher density suspension material evenly dispersed within the ceramic slurry and inhibits the suspension material from settling out of the ceramic slurry.

In referring to FIGS. 2 and 3, extruder 10 further includes seal device 48 positioned about rotatable drive shaft 42 and positioned between mixing motor 40 and a portion of interior 50 of chamber 14 of receptacle 12. In this example, seal device 48 is a ferrofluidic bearing. This sealing arrangement maintains ceramic slurry to be retained within receptacle 12 and permits rotatable drive shaft 42 to rotate dispersion blade 38 within interior 50 of receptacle 12 without permitting the ceramic slurry to migrate along rotatable shaft 42 from out of chamber 14 and top component 16 of receptacle 12, in this example.

Ceramic slurry material, in this example, is pressurized within receptacle 12 to provide assistance in extruding and to control extruding the ceramic slurry through nozzle 36 for laying down the ceramic slurry material. In an example of using ceramic slurry in an additive manufacturing process wherein the ceramic material is deposited onto a cold copper surface chilled with liquid nitrogen, the rate of flow in depositing the slurry onto this chilled surface needs to be controlled such that the material is deposited at a slow enough rate to freeze and not puddle on the copper surface.

Receptacle 12 includes inlet 52, as seen in FIG. 3, in fluid communication with interior 50 of receptacle 12 for introducing pressurized gas, such as air, into interior 50 of receptacle 12. One of a wide variety of pressures can be applied as needed to the gas including a pressure of one pound per square inch up to including twenty pounds per square inch.

Extruder 10 further includes mechanical vibrator device 54 which is secured to or otherwise in contact with receptacle 12. Mechanical vibrator device 54 is activated to impart vibrations to receptacle 12 and to the ceramic slurry content within receptacle 12. Mechanical vibrator device 54, in this example, includes an air powered vibrator that imparts vibrations to receptacle 12 and to the contents such as heterogeneous slurry such as ceramic slurry. The vibrations imparted to receptacle 12, in this example, is in the range from as low as including five thousand to up to and including thirty four thousand vibrations per minute. In this example, approximately ten thousand vibrations per minute are applied. The vibrations assist in maintaining the suspension material within the ceramic slurry in movement and from collecting or lumping together.

Nozzle 36, as mentioned above, is secured to receptacle 12 and in this example to bottom wall 18 of receptacle 12, as seen in FIGS. 2 and 4. Nozzle 36 defines first opening 56 positioned within interior 50 of receptacle 12, defines second opening 60 positioned outside of receptacle 12 and defines channel 58 which extends from first opening 56 through nozzle 36 to second opening 60 defining flow path 62 which extends from first opening 56, through channel 58 and to second opening 60. Nozzle 36 extends through wall 18 of receptacle 12 and into interior 50 of receptacle 12 such that first opening 56 is positioned spaced apart from wall 18 with first opening facing away from bottom wall 18 and first opening 56 extending across central axis 68 of nozzle 36. In this example, nozzle 36 includes tube 66 which extends from wall 18 of receptacle 16 and extends within interior 50 of receptacle 12.

As mentioned above, first opening 56 is positioned spaced apart from bottom wall 18, as seen in FIG. 4, with extruder 10 in an operational position P, as seen for example in FIG. 1. When working with a heterogeneous material such as in this example ceramic slurry having higher density suspended material such as fibers than the density of the liquid, gravity promotes settling out of the higher density suspensions within the slurry and directs the suspensions toward bottom wall 18 to accumulate such as with extruder 10 in operation position P, for example, as shown in FIG. 1. With mixing of the ceramic slurry with the operation of dispersion blade 38 and the agitation of the ceramic slurry with mechanical vibrator device 54, these operations assist in maintaining the higher density fibers in suspension and more evenly distributed within the ceramic slurry. These techniques reduce the amount of fibers settling out of suspension during the extruding process. However, the higher density suspended material such as fibers in this example that do achieve settling out through the operation of gravity during the extruding process move toward and accumulate at a position at or near bottom wall 18.

With first opening 56 of nozzle 36 positioned spaced apart from bottom wall 18 within interior 50 of receptacle 12, first opening 56 is beneficially spaced apart from bottom wall 18 and the settled out material such as the fibers that have settled out of suspension and have accumulated at bottom wall 18.

As a result, first opening 56 is beneficially positioned in the spaced apart position relative to bottom wall 18 from drawing, during the extruding process, those settled out accumulated fibers into nozzle 36 and undesirably blocking even flow of the ceramic slurry through nozzle 36 or otherwise blocking nozzle 36. The positioning of first opening 56 spaced apart from wall 18 mitigates the occurrence of uneven depositing of the ceramic slurry and blocking of nozzle 36. As a result, a higher quality of product is manufactured and timely and costly production delays are avoided with respect to cleaning or replacing nozzle 36 during the additive manufacturing process.

Figure 5:
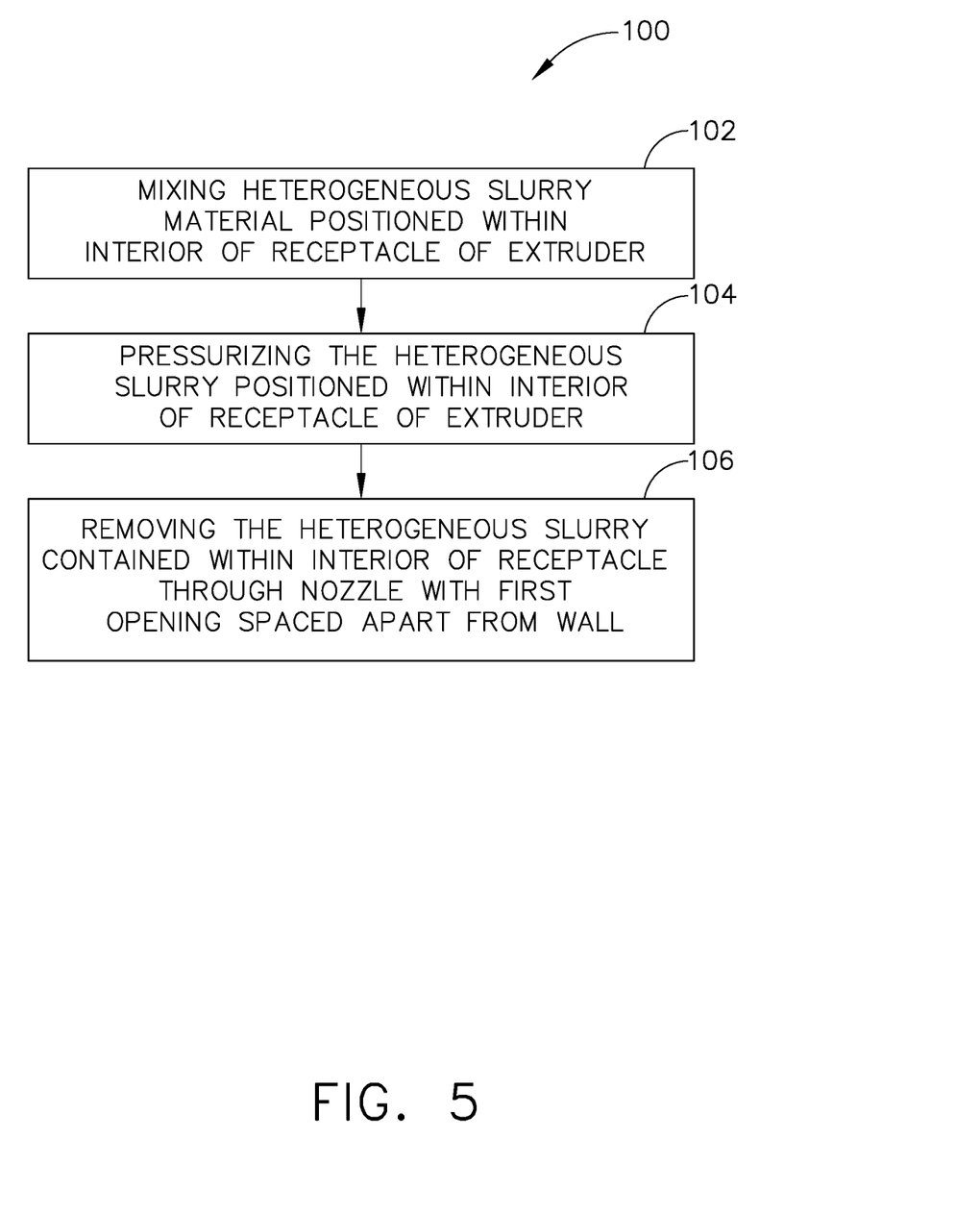
FIG. 5 is a flow chart of a method for extruding a heterogeneous slurry material from an extruder.

A method 100, as seen in FIG. 5, for extruding a heterogeneous slurry material from extruder 10 includes step 102 of mixing the heterogeneous slurry material positioned within interior 50 of receptacle 12 of extruder 10. Method 100 further includes step 104 of pressurizing the heterogeneous slurry positioned within interior 50 of receptacle 12 of extruder 10.

Method 100 further includes step 106 of removing the heterogeneous slurry contained within interior 50 of receptacle 12 through nozzle 36 secured to receptacle 12 and in fluid communication with heterogeneous slurry within interior 50 of receptacle 12. Nozzle 36 defines first opening 56 positioned within interior 50 of receptacle 12, defines second opening 60 positioned outside of receptacle 12 and defines channel 58 which extends from first opening 56 through nozzle 36 to second opening 60 defining a flow path 62 which extends through nozzle 36 from first opening 56, through channel 58 and to second opening 60. Nozzle 36 extends through wall 18 of receptacle 12 and into interior 50 of receptacle 12 such that first opening 56 is positioned spaced apart from wall 18.

Step 104 of pressurizing heterogeneous slurry further includes a step of inserting pressurized gas through inlet 52 of the receptacle 12 into interior 50 of receptacle 12 containing the heterogeneous slurry. Step 104 of pressurizing the heterogeneous slurry also includes the step of pressurizing the pressurized gas in a pressure range of including one pound per square inch up to and including twenty pounds per square inch.

Step 102 of mixing further includes a step of activating motor 40, including rotatable drive shaft 42 which extends from motor 40 into receptacle 12. Step 102 of mixing further includes coupling rotatable drive shaft 42 to mixing shaft 44 with mixing shaft 44 secured to dispersion blade 38 such that with activating of motor 40 dispersion blade 38 rotates within interior 50 of receptacle 12.

Step 104 of pressurizing the heterogeneous slurry further includes containing the pressurized heterogeneous slurry within receptacle 12 along rotatable drive shaft 42 with seal device or ferrofluidic bearing 48, as seen in FIG. 3, positioned around rotatable drive shaft 42. Step 102 of mixing further includes rotating rotatable drive shaft 42 in a range which includes one up to five hundred rotations per minute.

Method 100 for extruding a heterogeneous slurry material from extruder 10 further includes a step of activating a mechanical vibrator device 54 associated with chamber 14 of receptacle 12 imparting vibrations to chamber 14 and the heterogeneous slurry positioned within interior 50 of the chamber 14 of receptacle 12.

Method 100 for extruding a heterogeneous slurry material from extruder 10 further includes a step of placing heterogeneous slurry, which comprises ceramic slurry which comprises a plurality of fibers, into chamber 14 of receptacle 12.

Step 106 of removing the heterogeneous material is conducted at a select flow rate including a flow rate which includes two up to and including fifty grams per second.

While various embodiments have been described above, this disclosure is not intended to be limited thereto. Variations can be made to the disclosed embodiments that are still within the scope of the appended claims.

What is claimed:

1. A method for extruding a heterogeneous slurry material from an extruder, the method comprising:
   mixing the heterogeneous slurry material within an interior of a receptacle of the extruder with a rotatable drive shaft which extends within the receptacle, wherein a dispersion blade is secure to the rotatable drive shaft;
   pressurizing the heterogeneous slurry material positioned within the interior of the receptacle of the extruder; and
   removing the heterogeneous slurry material contained within the interior of the receptacle through a nozzle secured to the receptacle and in fluid communication with the heterogeneous slurry material within the interior of the receptacle, wherein:
      the nozzle defines a first opening positioned within the interior of the receptacle, defines a second opening positioned outside of the receptacle and defines a channel which extends from the first opening through the nozzle to the second opening defining a flow path which extends through the nozzle from the first opening, through the channel and to the second opening; and
      the nozzle extends upwardly through and from a bottom wall of the receptacle and into the interior of the receptacle such that the first opening is positioned above the bottom wall, faces the dispersion blade, faces away from the bottom wall, and extends across a central axis of the nozzle, and the second opening is positioned spaced apart from and below the bottom wall; and
   vibrating the receptacle via a mechanical vibrator, wherein the mechanical vibrator is in contact with the receptacle.

2. The method of claim 1, wherein pressurizing the heterogeneous slurry material further includes inserting pressurized gas through an inlet of the receptacle into the interior of the receptacle containing the heterogeneous slurry material.

3. The method of claim 2, wherein pressurizing the heterogeneous slurry material includes pressurizing the pressurized gas in a pressure range of including one pound per square inch up to and including twenty pounds per square inch.

4. The method of claim 1, wherein mixing the heterogeneous slurry material further includes activating a motor, comprising the rotatable drive shaft which extends from the motor into the receptacle.

5. The method of claim 4, wherein mixing the heterogeneous slurry material further includes coupling the rotatable drive shaft to a mixing shaft with the mixing shaft secured to the dispersion blade such that with the activating of the motor, the dispersion blade rotates within the interior of the receptacle.

6. The method of claim 4, wherein pressurizing the heterogeneous slurry material further includes containing the pressurized heterogeneous slurry material within the receptacle along the rotatable drive shaft with a ferrofluidic bearing positioned around the rotatable drive shaft.

7. The method of claim 5, wherein mixing the heterogeneous slurry material further includes rotating the rotatable drive shaft in a range which includes one up to five hundred rotations per minute.

8. The method of claim 1, further comprising activating the mechanical vibrator which imparts vibrations to the receptacle and the heterogeneous slurry material positioned within the interior of the receptacle.

9. The method of claim 1, further comprising placing the heterogeneous slurry material, which comprises a ceramic slurry which comprises a plurality of fiber, into the receptacle.

10. The method of claim 1, wherein removing the heterogeneous slurry material further includes removing the heterogeneous slurry material at a flow rate in a range of which includes two up to and including fifty grams per second.

11. The method of claim 1, wherein the rotatable drive shaft is connected to a mixing motor.

12. The method of claim 11, further includes a shaft clamp coupling the rotatable drive shaft to a mixing shaft.

13. The method of claim 12, wherein the dispersion blade is secured to the mixing shaft, which secures the dispersion blade to the rotatable drive shaft.

14. The method of claim 11, further includes a seal device positioned about the rotatable drive shaft.

15. The method of claim 14, the seal device is positioned between the mixing motor and the interior of the receptacle.

16. The method of claim 14, wherein the seal device comprises a ferrofluidic bearing.

17. The method of claim 1, wherein the receptacle further comprises an inlet in fluid communication with the interior of the receptacle for introducing pressurized gas into the interior of the receptacle.

18. The method of claim 17, wherein the inlet is configured to be in fluid communication with the interior of the receptacle which introduces the pressurized gas in a range including one pound per square inch up to and including twenty pounds per square inch.

19. The method of claim 11, wherein the mixing motor rotates the rotatable drive shaft at a rate of rotation within a range which includes one rotation per minute up to and including five hundred rotations per minute.

20. The method of claim 1, wherein the mechanical vibrator generates vibrations within a range which includes five thousand vibrations per minute up to and including thirty-four thousand vibrations per minute.

* * * * *